United States Patent
Fang et al.

(10) Patent No.: US 8,109,350 B2
(45) Date of Patent: Feb. 7, 2012

(54) POLYCRYSTALLINE ABRASIVE COMPOSITE CUTTER

(75) Inventors: Zhigang Z. Fang, Salt Lake City, UT (US); Stephen C. Johnson, Roy, UT (US); Haibo Zhang, Salt Lake City, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 228 days.

(21) Appl. No.: 12/161,526

(22) PCT Filed: Jan. 26, 2007

(86) PCT No.: PCT/US2007/002180
§ 371 (c)(1),
(2), (4) Date: Apr. 17, 2009

(87) PCT Pub. No.: WO2007/089590
PCT Pub. Date: Aug. 9, 2007

(65) Prior Publication Data
US 2009/0218146 A1    Sep. 3, 2009

Related U.S. Application Data

(60) Provisional application No. 60/762,794, filed on Jan. 26, 2006.

(51) Int. Cl.
*E21B 10/46* (2006.01)
(52) U.S. Cl. ........ 175/434; 175/425; 175/426; 29/527.1
(58) Field of Classification Search ................. 175/434, 175/425, 426; 29/527.1; 428/119, 120, 216, 428/217, 336, 472, 698, 699
See application file for complete search history.

(56) References Cited

U.S. PATENT DOCUMENTS

| | | | |
|---|---|---|---|
| 4,128,136 A | | 12/1978 | Generoux |
| 4,255,165 A | * | 3/1981 | Dennis et al. .................... 51/309 |
| 4,592,433 A | * | 6/1986 | Dennis .......................... 175/428 |
| 4,605,343 A | * | 8/1986 | Hibbs et al. .................... 407/119 |
| 4,627,503 A | * | 12/1986 | Horton ........................ 175/420.2 |
| 4,866,885 A | * | 9/1989 | Dodsworth ..................... 51/293 |
| 5,135,061 A | * | 8/1992 | Newton, Jr. .................... 175/428 |
| 5,217,081 A | | 6/1993 | Waldenstrom et al. |
| 5,238,074 A | | 8/1993 | Tibbitts et al. |
| 5,266,388 A | * | 11/1993 | Santhanam et al. .......... 428/212 |
| 5,478,634 A | * | 12/1995 | Setoyama et al. ............ 428/216 |
| 5,492,188 A | | 2/1996 | Smith et al. |
| 5,503,912 A | * | 4/1996 | Setoyama et al. ............ 428/216 |
| 5,709,907 A | * | 1/1998 | Battaglia et al. ........... 427/126.1 |
| 5,722,803 A | * | 3/1998 | Battaglia et al. ............. 407/119 |
| 5,976,716 A | * | 11/1999 | Inspektor ...................... 428/698 |
| 6,054,185 A | * | 4/2000 | Inspektor ................... 427/419.7 |
| 6,103,357 A | * | 8/2000 | Selinder et al. .............. 428/216 |
| 6,117,533 A | * | 9/2000 | Inspektor ...................... 428/216 |
| 6,187,068 B1 | | 2/2001 | Frushour et al. |

(Continued)

*Primary Examiner* — Jennifer H Gay
(74) *Attorney, Agent, or Firm* — Thorpe North & Western LLP

(57) ABSTRACT

A polycrystalline abrasive composite cutter, including a tool body with a top cutting surface and a flank surface. The composite cutter, joined to a substrate, constitute a shear cutter for a PDC bit, roller-cone bit insert, or other tool that can be highly useful for petroleum drilling or other applications. The body of the polycrystalline abrasive composite cutter includes a plurality of polycrystalline abrasive layers (90) and a plurality of arresting layers (100). The polycrystalline abrasive layers (90) and the arresting layers (100) are arranged to alternate throughout the tool body in a direction normal to the top cutting surface (92) and in a direction normal to a flank surface (94).

23 Claims, 4 Drawing Sheets

U.S. PATENT DOCUMENTS

| | | | |
|---|---|---|---|
| 6,189,634 B1 | 2/2001 | Bertagnolli et al. | |
| 6,193,001 B1 | 2/2001 | Eyre et al. | |
| 6,258,139 B1 | 7/2001 | Jensen | |
| 6,309,738 B1 * | 10/2001 | Sakurai | 428/216 |
| 6,333,099 B1 * | 12/2001 | Strondl et al. | 428/216 |
| 6,361,873 B1 | 3/2002 | Yong et al. | |
| 6,401,845 B1 | 6/2002 | Fielder | |
| 6,446,740 B2 | 9/2002 | Eyre | |
| 6,593,015 B1 * | 7/2003 | Inspektor | 428/698 |
| 6,655,481 B2 | 12/2003 | Findley et al. | |
| 6,660,133 B2 * | 12/2003 | Penich et al. | 204/192.1 |
| 6,696,137 B2 * | 2/2004 | Yong | 428/175 |
| 6,742,611 B1 * | 6/2004 | Illerhaus et al. | 175/433 |
| 6,841,260 B2 | 1/2005 | Sue et al. | |
| 6,884,499 B2 * | 4/2005 | Penich et al. | 428/216 |
| 7,179,023 B2 * | 2/2007 | Goudemond et al. | 407/119 |
| 7,435,377 B2 * | 10/2008 | Cho et al. | 419/14 |
| 7,487,849 B2 * | 2/2009 | Radtke | 175/434 |
| 7,585,342 B2 * | 9/2009 | Cho | 51/309 |
| 7,842,111 B1 * | 11/2010 | Sani | 51/309 |
| 2002/0007972 A1 | 1/2002 | Yong et al. | |
| 2003/0051924 A1 * | 3/2003 | Tsuda et al. | 175/426 |
| 2005/0133277 A1 * | 6/2005 | Dixon | 175/426 |
| 2006/0254830 A1 * | 11/2006 | Radtke | 175/426 |
| 2007/0298232 A1 * | 12/2007 | McNerny et al. | 428/216 |
| 2008/0023230 A1 * | 1/2008 | Cho | 175/432 |
| 2008/0166588 A1 * | 7/2008 | Astrand | 428/635 |
| 2009/0067938 A1 * | 3/2009 | Omori et al. | 407/119 |
| 2009/0071724 A1 * | 3/2009 | Drivdahl et al. | 175/403 |
| 2009/0078469 A1 * | 3/2009 | Drivdahl et al. | 175/374 |
| 2009/0218146 A1 * | 9/2009 | Fang et al. | 175/428 |
| 2010/0008738 A1 * | 1/2010 | Drivdahl et al. | 408/199 |
| 2010/0255199 A1 * | 10/2010 | Gates et al. | 427/255.394 |
| 2010/0255345 A1 * | 10/2010 | Ban et al. | 428/698 |

* cited by examiner

US 8,109,350 B2

POLYCRYSTALLINE ABRASIVE COMPOSITE CUTTER

RELATED APPLICATIONS

This application claims the benefit of earlier filed U.S. Provisional Patent Application No. 60/762,794, filed Jan. 26, 2006 which is incorporated by reference herein.

BACKGROUND OF THE INVENTION

Polycrystalline diamond compact (PDC), also known as shear cutters, are important cutting components on a PDC bit for petroleum drilling. FIG. 1 illustrates how the cutter interacts with the rock formation during drilling. The shear cutters are designed and fabricated with a polycrystalline diamond overlay on cemented tungsten carbide substrates. The cemented tungsten carbide substrates provide a rigid support to the diamond layer. The diamond layer is in direct contact with the rock formation during drilling. The extremely high wear resistance of diamond leads to the excellent durability of the cutters, and the bit, that would not be possible with other materials. However, continued improvement in drilling technology and ever increasing demand for higher productivity has generated a strong need for further improvement in cutter technology. The shear cutters are subjected to higher stress, harder rock, and more impact load conditions. As a result, typical failure modes of shear cutters are by edge chipping and eventual catastrophic breakage. The industry faces the challenge of how to improve bit life and durability to be able to drill deeper and harder formations. It is highly desired to improve impact resistance of the polycrystalline diamond compact shear cutter without compromising its abrasive wear resistance.

SUMMARY OF THE INVENTION

Accordingly, the present invention discloses a shear cutter with functionally designed polycrystalline diamond composite overlay which further improves the performance of shear cutters. The present invention provides a polycrystalline abrasive composite cutter, including a tool body with a top cutting surface and a flank surface. The tool body can include a plurality of polycrystalline abrasive layers and a plurality of arresting layers. The layers can alternate throughout the tool body in a direction normal to the top cutting surface and in a direction normal to a flank surface. In one embodiment, the cutting surface and flank surface(s) can have multiple arresting layers across each surface so as to substantially arrest crack propagation through the polycrystalline superabrasive material. In another embodiment, at least a portion of the plurality of arresting layers can be oriented substantially parallel to at least one surface of the tool body.

In accordance with the present invention, a method of making a polycrystalline superabrasive composite cutter can include the steps of forming a cutter precursor with a tool body including a top surface and a flank surface. The cutter precursor can include a plurality of abrasive precursor layers and a plurality of arresting layers configured so that the layers alternate throughout the tool body in a direction normal to the top cutting surface and in a direction normal to a flank surface. The method can further include treating the cutter precursor under pressure and temperature conditions sufficient to form a polycrystalline abrasive composite cutter having arresting layers and polycrystalline primary layers.

In one embodiment, the step of forming a cutter precursor can include forming a substantially planar laminate assembly of alternating abrasive precursor layers and arresting layers. The abrasive precursor layers can include a first primary particulate abrasive and the arresting layers can include a second particulate material. There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

Figure 1:
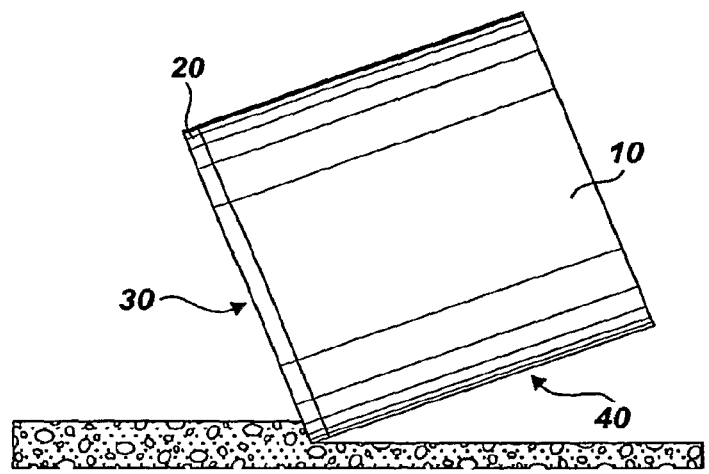
FIG. 1 shows a side view of a typical PDC cutter while cutting rock formation by shearing.

The drawings will be described further in connection with the following detailed description. Further, these drawings are not necessarily to scale and are by way of illustration only such that dimensions and geometries can vary from those illustrated.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

It must be noted that, as used in this specification and the appended claims, the singular forms "a," "an," and "the" include plural referents unless the context clearly dictates otherwise. Thus, for example, reference to "a cutter" includes one or more of such cutters, reference to "a layer" includes reference to one or more of such features, and reference to "heating" includes reference to one or more of such steps.

Definitions

In describing and claiming the present invention, the following terminology will be used in accordance with the definitions set forth below.

As used herein, "abrasive" refers to any material having sufficient hardness to abrade or otherwise remove materials from a workpiece. Typical abrasive materials can include refractory metal carbides of refractory metal such as W, Mo, Nb, Ti, Ta, and mixtures or alloys thereof; superabrasives; alumina, titania, sapphire, silica, cermets, borides, nitrides, carbonitrides, and the like.

As used herein, "superabrasive" refers to abrasive materials with exceptionally high hardness such as diamond, diamond-like materials, and cubic boron nitride.

As used herein, "alternating" means that at least some layers are differing from adjacent layers. For example, typical alternating layers will involve sequential alternating, e.g. superabrasive material, arresting layer, superabrasive material, arresting layer, etc. However, other alternating arrangements can include irregular or random arrangements or occasional repeated layers.

As used herein, "arresting" refers to a property and or effect of a material whereby cracks or other destructive or deteriorating occurrences within one area of material is halted, slowed, reduced, and/or isolated.

As used herein, "continuous" refers to a single uninterrupted length. For example, as used with the continuous layer extending from one surface to the other, one layer would have a terminal end at part of one surface. The same layer would then continue into the tool body and an opposite terminal end would meet another surface.

As used herein, "cracks" refer to areas of the material wherein the material itself evidences destructive or deteriorating occurrences. Typically, cracks are occurrences within a material wherein the material separates where generally larger separations occur near a surface. Cracks in polycrystalline material typically propagate along intercrystalline grain boundaries; however, the crack can periodically run across a single crystal grain. The presence of an arresting layer acts to interrupt crack propagation and isolate the crack to a single PCD layer, thus minimizing damage to the cutter.

As used herein, "cutter" refers generally to any abrasive tool design which can be used to remove material from a workpiece. Non-limiting examples of cutters can include shear cutters, roller-cone inserts, drill segments, inserts, machining inserts, and the like.

As used herein, "flank" refers to a surface which has a normal vector at least 45° from a normal vector of a top surface at or near a central axis of the tool body. The flank surfaces generally experience a higher degree of sliding friction cutting action than top surfaces of the cutters, which tend to experience impact or shear cutting forces.

As used herein, "top surface" refers to a portion of a working surface on a tool body which is facing a direction of movement during normal use. For example, although a typical shear cutter has a planar top surface the top surface is normally oriented at an offset angle with respect to a workpiece. Although a top surface can be contoured, the top surface is generally defined as the portion which is opposite the back side of the cutter/substrate and oriented generally about a central axis of the tool body.

As used herein, "hardness" is a measure of resistance to deformation by indentation or by surface abrasion.

As used herein, "toughness" is a measure of the amount of energy absorbed by a material as it fractures, e.g. the total area under a tensile stress-strain curve. Under many conditions for uniform abrasive materials hardness and toughness are inversely related, i.e. as hardness increases, toughness decreases. The present invention often allows for increase in toughness without a significant loss of hardness.

As used herein, "multiple" refers to a number indicating more than one, and upper bounds not limited in theory, but generally limited in practical application.

As used herein, "substantial" when used in reference to arresting crack propagation refers to an orientation that is sufficient to impair, slow, halt, or impede crack propagation. When used in reference to particular orientations, such as "substantially perpendicular", the angle so indicated is approximately, near, or about 90 degrees, or such that the same or equal desired effect is obtained. When used in reference to a particular geometric shape, "substantially" refers to a shape that is similar, equal in effect, or consists of similar aspects of that particular shape. For example, where a cube may be referenced, a boxed shape wherein faces of the box are rhombus-like in that they do not contain right angles would still be included as substantially cubic. Further, "substantially all" or the like refers to an amount that is sufficient to provide an effect that the material or characteristic was intended to provide. The exact degree of deviation allowable may in some cases depend on the specific context. Similarly, "substantially free of" or the like refers to the lack of an identified element or agent in a composition. Particularly, elements that are identified as being "substantially free of" are either completely absent from the composition, or are included only in amounts which are small enough so as to have no measurable effect on the composition.

As used herein, a plurality of items, structural elements, compositional elements, and/or materials may be presented in a common list for convenience. However, these lists should be construed as though each member of the list is individually identified as a separate and unique member. For example, tungsten and molybdenum are both useful refractory metals. However, tungsten is a stronger carbide former and may therefore be more or less preferable for a specific application. Thus, no individual member of such list should be construed as a de facto equivalent of any other member of the same list solely based on their presentation in a common group without indications to the contrary.

As used herein, "about" refers to a degree of deviation based on experimental error typical for the particular property identified. The latitude provided the term "about" will depend on the specific context and particular property and can be readily discerned by those skilled in the art. The term "about" is not intended to either expand or limit the degree of equivalents which may otherwise be afforded a particular value. Further, unless otherwise stated, the term "about" shall expressly include "exactly" consistent with the discussion below regarding ranges and numerical data.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 micron to about 5 microns" should be interpreted to include not only the explicitly recited values of about 1 micron to about 5 microns, but also include individual values and sub-ranges within the indicated range. Thus, included in this numerical range are individual values such as 2, 3, and 4 and sub-ranges such as from 1-3, from 2-4, and from 3-5, etc.

This same principle applies to ranges reciting only one numerical value. Furthermore, such an interpretation should apply regardless of the breadth of the range or the characteristics being described.

The Invention

In accordance with the present invention, a composite design that has superior chipping resistance compared to conventional polycrystalline diamond (PCD) materials or conventional polycrystalline diamond compact (PDC) shear cutter designs is described herein. The composite and shear cutter design, presented in this disclosure, can have carefully controlled chipping resistance. Use of the superabrasive composite cutter and shear cutter designs can improve durability of the cutters and improve efficiency. Further, use of the present invention, particularly in commercial drilling operations, can reduce the overall costs of such operations.

For ease in explanation, the superabrasive material in the present invention, as described below, is generally referred to as PCD, which is a preferred material, but should not be taken as a limitation upon the overall invention. Specifically, any abrasive material can be used in the primary layer, as long as the primary layers are formed of an abrasive material and arranged in the alternating layer configuration as described herein. Likewise, WC—Co is often referenced as the abrasive material used in arresting layers, but should not be taken as a limitation on the materials that could be used for the arresting layers. Further, the explanation generally refers to the application of the polycrystalline superabrasive composite cutter as attached to a cutting substrate to create a superabrasive cutting tool, more specifically configured as a shear cutter. Again, this should not be considered a limitation on the present invention, but rather ease in explanation as the polycrystalline superabrasive composite cutter can be used in connection with additional tools and applications. Non-limiting examples of tools which can benefit from application of the present invention can include drill bit cutters, contoured drill flank segments, drill bit end-mill tips, turning and shaping tools, milling and grinding tools, polishing tools, dressing tools, wire drawing dies, machining tools, and the like.

As illustrated in FIG. 1, a common PCD compact shear cutter has a body 10, often composed of tungsten carbide. The body is often cylindrical with a flat top covered with an abrasive layer of PCD 20. In the cylindrical shape, the PCD cutter has a top surface 30 and a flank surface 40. In normal use, such PCD cutter is rotating about a bit body rotation axis to which bit body the PCD cutter is attached and moving in a generally forward direction (to the left, as presently illustrated). As can be seen, the cutter can have an outer ring of working surface which includes the area of the flank nearest the top surface, and the outer portion of the top surface nearest the flank. For cylindrically shaped cutters, the working surface can resemble a thick washer.

As previously discussed, PCD and like cutters are placed in difficult working conditions and can experience cracking and other damage to the abrasive material. Due to the low toughness of material such as PCD, cracks are easily propagated. Thus, a small crack quickly damages an entire cutter. In order to prevent such crack propagation, the present invention proposes a polycrystalline abrasive composite cutter with a tool body having a top cutting surface and a flank surface. The tool body can include a plurality of polycrystalline abrasive layers and a plurality of arresting layers so that the layers alternate throughout the tool body in a direction normal to the top cutting surface and in a direction normal to a flank surface. By incorporating arresting layers, the cutter is able to arrest cracks before they propagate throughout the entire cutting material. Thus, a cutter can experience chips or cracks and not compromise the entire cutter. In this invention, the PCD composition at and near the cutting edges of the cutters are functionally designed to provide higher toughness and impact resistance without comprising the wear resistance of the standard monolithic PCD materials for each specific applications.

Figure 2:
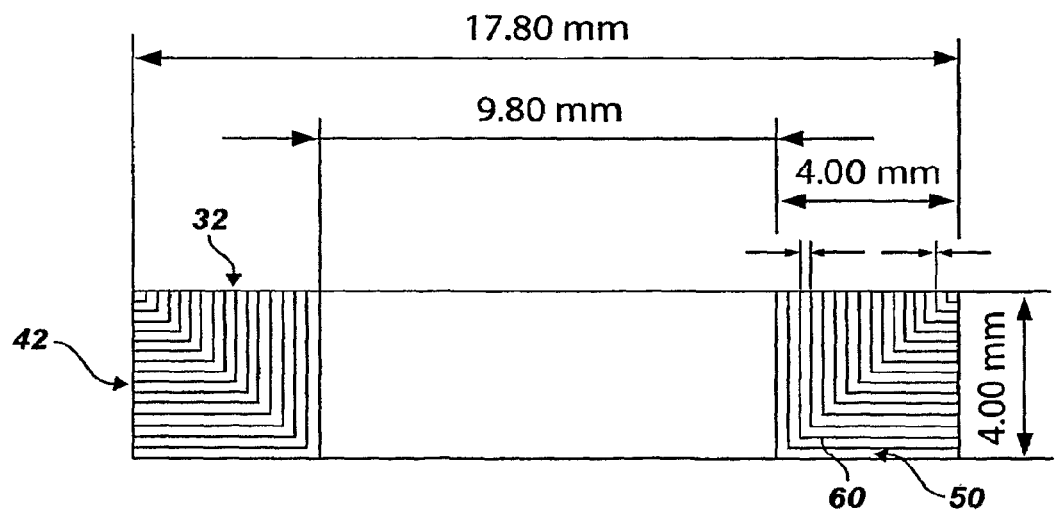
FIG. 2 shows a cross-sectional view of the layer structure of a cutting surface according to one embodiment of the present invention.

The layers normal to the top cutting surface and normal to a flank surface can allow for a variety of overall configurations. Such measurement can be taken at different places along the length or area of the flank and the surface. It should be noted, however, that the layers are to alternate through the direction normal to the top cutting surface and in a direction normal to a flank surface. Such lines normal to the surfaces are not necessarily normal to the layers. In one aspect, the direction normal to the top cutting surface can be near the periphery of the top cutting surface. In an alternate aspect, the direction normal to the top cutting surface can be near the center or middle of the top cutting surface. In the case of a cylindrical cutter, the first embodiment would be taken as viewed near the outer diameter and parallel to the plane of a flank surface. The second embodiment, however, would be a line concentric with the cylinder axis. Further, any variation is herein encompassed by the present invention (e.g. a line normal to the top surface and a distance in from the outer circumference of a top cutting surface, yet not in the center). Likewise, a direction normal to a flank surface can be taken at any location along the flank surface. Such location can be just below the top cutter surface, or can be further from the top cutter surface. The flank surface and top surface can be non-coincident, and in many embodiments can be substantially perpendicular to one another. In one embodiment, the arresting layers and the polycrystalline abrasive layers can be distributed within the tool body such that a plurality of arresting layers terminate on each of the top cutting surface and the flank surface. Such configuration is illustrated in FIG. 2. As can be seen, both the top cutting surface 32 and the flank surface 42 have terminating polycrystalline abrasive layers 50 and terminating arresting layers 60 exposed at each surface. It should be noted that the illustrated embodiment shows a particular configuration wherein the cutting surface having the alternating layers is annular, i.e. shallow hollow cylinder. Further, in the embodiment shown, the alternating layers each individually extend to contact both the top edge and the flank edge. Another feature of the illustrated embodiment is that each of the arresting layers are oriented substantially perpendicular to both the top cutting surface and the flank surface over at least a portion of the respective layers. Thus, other embodiments can include alternating layers having various contours which are not always perpendicular. For example, curved, wavy, or other contours can be useful for use in particular tools. In another embodiment, the arresting layers can be oriented substantially perpendicular to either the top cutting surface or the flank surface, but not both.

Further, in another aspect of the present invention, the arresting layers can be discontinuous such that one or more of the arresting layers which alternate in a direction normal to the top surface are not the same arresting layers which alternate in a direction normal to the flank surface. Although not illustrated, in one embodiment wherein the arresting layers terminate on the surface of the top cutting surface and the flank surface, the layers can be non-continuous from the flank surface to the top cutting surface. In this embodiment alternating layers of primary polycrystalline material and arresting layers can be oriented along each of the top cutting surface and the flank surfaces. In one variation of this design, additional breaks in the arresting layers can be provided along the circumference of a cylindrical tool, e.g. as arresting layers radially extending outward along the top surface. As a result, crack propagation can be arrested along the circumference of the cutting surfaces, as well as radially. The continuity along the circumference is also not necessarily a complete circle (360°). However, the cutting edge can preferably be substantially continuous, for example, at least 1/32 of a circle, and preferably 1/8 of a circle (45°) or more.

Figure 3:
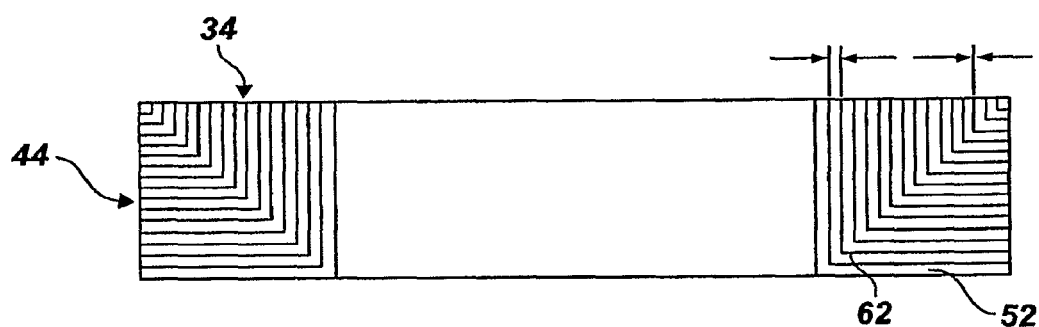
FIG. 3 shows a cross-sectional view of the layer structure of a cutting surface according to one embodiment of the present invention.

In another configuration, at least a portion of the arresting layers can be oriented substantially parallel to at least one surface of the tool body. In a further embodiment, the arresting layers can be oriented substantially parallel to both the top cutting surface and the flank surfaces. One alternative embodiment having arresting layers parallel to both the top 34 and flank 44 cutting surfaces is illustrated in FIG. 3. As with the figure before, the polycrystalline abrasive layers 52 and the arresting layers 62 alternate throughout the tool body. The tool body of FIG. 3 is in the shape of a washer, i.e. annular. In this embodiment, when a crack occurs in the polycrystalline abrasive layer, the crack can extend throughout and long a single outer top cutting surface and/or the flank. The layers can be configured such that arresting layers can prevent the crack from propagating inward and damaging additional layers of the polycrystalline abrasive material. During use, outermost layers of material can chip off and the thin arresting layer will likely wear off, thus providing a newly sharpened cutting surface.

Figure 4:
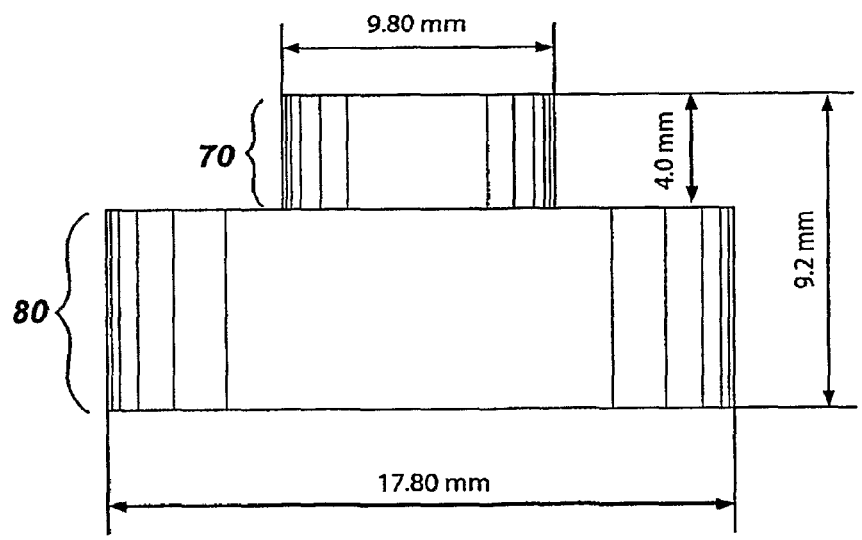
FIG. 4 shows a cross-sectional view of a substrate that can be used in one embodiment of the present invention.

In some embodiments, it may be beneficial to couple the superabrasive cutter to a substrate. For some designs, this may be a direct and planar coupling. In other designs, such as with FIGS. 2 and 3, the circular washer shape can be attached to a substrate of the form shown in FIG. 4. The substrate can have a top portion 70 and a bottom portion 80 where the top portion has a smaller diameter than the bottom portion. In one embodiment, the materials making up the substrate can be homogeneous, e.g. both the top and the bottom portions of the same material, or they can be heterogeneous. In one specific example, the substrate can comprise or consist essentially of WC—Co. Other suitable substrate materials can include, but are not limited to, Ti, W, Mo, V, transition metals (Fe, Ni, Co), and alloys, carbides, or composite thereof. The height and diameter of the top portion of the substrate can be configured so as to more efficiently use the polycrystalline abrasive material and corresponding arresting layers in areas of the tool that are designed to be the contact or working surface.

Beyond the arrangement of layers, the overall shape of the superabrasive composite cutter can vary depending on the anticipated use. In one embodiment, the cutter can be substantially a cylinder and the flank surface can correspond to a circumferential wall of the cylinder. In another configuration, the superabrasive composite cutter can be cube-shaped. Composite cutters of the type disclosed herein can further include a substrate attached opposite a cutting surface to form an abrasive cutting tool. Further, such abrasive cutting tool can be configured for use as a drag-tool, or more specifically as a shear cutter.

In one embodiment, the arresting layers can have a higher toughness and a lower hardness than contacting polycrystalline abrasive layers. In one aspect, each of the arresting layers can have a fracture toughness about 10% to about 400% higher than the respective contacting polycrystalline abrasive layers. In another aspect, the arresting layers can have a hardness of about 5% to about 50% lower than the contacting polycrystalline abrasive layers. The wear resistance and impact resistance are two important properties for PCD material and the cutters. It is common to almost all materials that the higher the wear resistance, the lower the toughness. This is a classic trade-off that engineers often have to make to match material selections with specific applications. While this approach is effective for many situations, effective combinations can get exhausted and then, a breakthrough has to be made to establish a new level of standard.

For PDC shear cutters, the superior wear resistance depends on the polycrystalline diamond. The impact resistance of the PCD layer can depend on the composition of the PCD materials and the geometric design of cutter. The design aspects of the cutter can include: (a) the overall geometry and dimension of the cutter, (b) the PCD layer thickness, and (c) the interface geometry of the PCD layer with the WC—Co substrate based on thermal stress management analysis.

The state-of-the-art design with regard to the thickness and the interface geometry is based on macro mechanical stress analysis. The current invention improves performance of the cutter by using a PCD/WC—Co composite material with functionally designed meso- and/or micro-structure particularly near the cutting edges or working surfaces. The composite material is designed to have a capacity to mitigate crack propagation and minimize fracture and therefore improve the overall durability of the shear cutters.

In a conventional shear cutter, the cutting layer is made of monolithic PCD, e.g. FIG. 1. The overall thickness of the cutting layer can range from 0.5 to 10 mm, although other thicknesses may be useful. According to the current invention, the cutting layer can be made of laminates with functionally designed microstructure consisting of multiple alternating layers of PCD and PCD/WC—Co materials. In other words, the PCD layer of the conventional shear cutter can be replaced with laminates of PCD with another material, e.g. PCD/WC—Co composite, which is tougher than monolithic PCD. The laminate can be structured in such a way that the cutting edge has superior chipping resistance due to the configuration of the multiple layers because when a crack initiates at the surface, the propagation of such cracks will be interrupted, mitigated, or arrested by the tougher layer in-between two monolithic PCD layers. Because the crack could propagate along both the side and the top surfaces, the laminate can be structured in such a way that the layers alternate in both directions such that crack propagation can be arrested.

The thickness of each alternating layer of the cutter can be custom designed (e.g. between 1 micrometer and 1 millimeter) such that the crack and chipping of one layer does not degrade the functionality of the cutter significantly, the cutter can continue the cutting operation effectively even if one or even more of the alternating layers is lost. The degradation of the cutter will be by continued sequential crack initiation and chipping of individual layers. The failure of each layer requires crack initiation and propagation. The complete failure of a cutter is not achieved until most or all layers are chipped away, depending on cutter design. This controlled crack initiation and chipping process of the cutter is superior to the conventional cutters in which once a crack is initiated, the crack propagation will likely cause large chipping or catastrophic breakage of the entire cutting edge and terminate the useful cutting capacity of the cutter. This progressive arresting of cracks during use can also act as a self-sharpening mechanism by which renewed substantially undamaged working surfaces can be exposed.

Various parameters such as the number, size, and arrangement of polycrystalline abrasive layers and arresting layers can greatly affect the performance of an abrasive tool. In one embodiment, the cutter can include about 4 to about 100 arresting layers. In a further embodiment, the cutter can have about 20 to about 100 arresting layers. Likewise, the cutter can have, in one embodiment, from about 5 to about 100, preferably 12 to 100, and most preferably about 20 to about 100 polycrystalline abrasive layers. Each of the arresting and/or polycrystalline abrasive layers can include sub-layers having the same or different compositions. For example, at least one of the plurality of arresting layers can include a plurality of sub-layers, for example, three sub-layers. Likewise, the polycrystalline abrasive layers can include sub-layers. These sub-layers or alternating layers can also be in the form of varying or graded compositions. For example, adjacent sub-layers can include varying amounts of refractory metal and or superabrasive from neighboring layers.

Thus, either within sub-layers or across a plurality of arresting layers, the composition of the arresting layers and/or sub-layers can be varied to tailor cutting properties of the final tool. As a non-limiting illustration, outer arresting layers of an annular composite can include a greater amount of superabrasive, while inner arresting layers which become exposed during use can include higher carbide/metal alloy content. This change in compositions of the arresting layers (and/or polycrystalline layers) can facilitate careful control of impact resistance and durability while taking into account a changed tool behavior as the tool becomes worn.

Specific dimensions of the arresting layers and cutter geometry can vary considerably depending on the intended application. Of particular note are the relatively thin dimensions of the arresting and polycrystalline layers. Specifically, each of the arresting layers and the polycrystalline layers are typically in the micron range, i.e less than 1 mm, and are most often less than about 100 μm for the arresting layers and less than about 500 μm for the polycrystalline layers. In one aspect of the invention, the polycrystalline superabrasive composite cutter can contain arresting layers with a thickness from about 1 μm to about 100 μm. In a further variation, the arresting layers can have a thickness from about 1 μm to about 50 μm. In still a further embodiment, the arresting layers can have a thickness from about 20 μm to about 40 μm. A further variation of the invention includes a polycrystalline superabrasive composite cutter having arresting layers which are separated from one another by distances that range from about 1 μm to about 1000 μm. Likewise, in one embodiment, the polycrystalline abrasive layers can have a thickness from about 1 μm to about 1000 μm. In a further embodiment, the polycrystalline abrasive layers can have a thickness from about 10 μm to about 500 μm. In still a further embodiment, the polycrystalline abrasive layers can have a thickness from about 150 μm to about 300 μm. A further consideration in arranging the layers of the tool body is the ratio of the thickness of the arresting layers to the thickness of the polycrystalline abrasive layers. In one embodiment, the ratio of a thickness of arresting layers to a thickness of a polycrystalline abrasive layer is about 1:4 to about 1:75. In a further embodiment, the ratio can be from about 1:5 to about 1:50. And in still another embodiment, the ratio can range from about 1:5 to about 1:20, with one specific embodiment having a ratio of about 1:10. The number, spacing, and dimensions of the arresting layers can be adjusted to achieve a desired performance, which balances hardness, wear resistance, and useful life. The desired configurations can also change based on the specific application, e.g. aggressive cutting applications generally require thicker PCD layers or greater distance between arresting layers. The relatively thin configuration of alternating layers is a laminate material.

Selection of materials used in both the arresting layers and the abrasive layers can greatly affect the performance of the cutting tool. In one aspect of the invention, the abrasive layers can comprise a polycrystalline superabrasive material such as polycrystalline diamond (PCD) or polycrystalline cubic boron nitride (PCBN). In one aspect, the PCD and/or PCBN can typically be formed using micron diamond of about $^{40}/_{50}$ mesh or smaller in order to provide a hard and high quality polycrystalline material. In another alternative, the polycrystalline superabrasive layers can further include refractory metal carbides or other additives in up to about 50 vol %. Such additives can be useful in allowing for further increased variability in designed hardness, toughness, durability and performance for a particular application. Non-limiting examples of suitable starting materials for use in the abrasive layers can include diamond, hexagonal boron nitride, tungsten carbide, refractory metal carbides, and combinations thereof. Thus, in some embodiments the primary abrasive layers can comprise, or consist essentially of, non-superabrasive abrasives. Further, the non-superabrasives can generally comprise greater than 50% of the abrasive layer. In such embodiments the arresting layers can comprise another abrasive layer having a different grade as discussed herein, e.g. a mixture of abrasive with one or more metals or metal alloys such as those discussed below. These non-superabrasive abrasive tools can be highly useful in applications such as, but not limited to, metal machining, mining, construction, and woodworking.

Likewise, in a further aspect of the invention, the arresting layers can comprise an abrasive material. The abrasive material can have a higher toughness and lower hardness than the superabrasive material. In general the arresting layers can include or consist essentially of materials such as, but not limited to, refractory metals e.g. W, Mo, Ti, V, Cr, refractory metal carbides, refractory metal nitrides, superabrasives, metal alloys, and combinations or composites thereof. More specifically, the arresting layers can comprise a refractory metal carbide and a polycrystalline superabrasive. Alternatively, the arresting layers can consist essentially of a refractory metal carbide. In a further embodiment, the arresting layers can consist essentially of a refractory metal carbide and an optional metal. In yet another alternative, the arresting layers can consist essentially of a polycrystalline superabrasive. In this particular case, the arresting layers can be made to have lower hardness than the primary layer by providing larger particulate starting materials and/or by addition of more or less sintering aid during formation which can effect the quality and strength of the sintered polycrystalline mass formed. Alternatively, small quantities of carbide former or other impurity which decrease the hardness of the arresting layer can be included.

The relationship of the layers and the overall tool body configuration may better be understood through several examples. Although thicknesses and configuration can vary, the following discussion provides exemplary guidance for typical applications. The thickness of the entire cutting edge or layer with functionally designed microstructure can range from about 1 to about 10 nm. The thickness of each individual monolithic PCD layer can range from about 1 to about 1000 microns. This layer is designated as the primary PCD composition that can have excellent wear resistance. The thickness of each individual layer between the monolithic primary PCD layers can be between about 1 to about 100 microns, although other dimensions may be suitable. Relative to the monolithic primary PCD layer, the inter-(primary) PCD layers can include, or consist essentially of, materials that have lower hardness and higher toughness. For example, the inter-PCD layer can consist of the composite of PCD and tungsten carbide and Co (WC—Co). Alternatively, the inter-(primary) PCD layer material can consist of 100% WC—Co. In yet another alternative, the inter-layer can also consist of 100% of another grade of PCD that has lower hardness but higher toughness compared to the first primary PCD layer.

The cutter according to this invention may also consist of a top surface layer that can be composed of 100% of the primary PCD composition and the laminate which can in some embodiments also be the subsurface material. In one aspect, this top surface PCD layer can be less than 1.0 nun in thickness.

The current invention improves impact resistance of the shear cutter by functionally engineering the microstructure. The primary PCD composition insures that the cutter has superior abrasive wear resistance as that of an equivalent standard shear cutter. The inter-(primary) PCD layer can be designed to absorb impact energy, and interrupt and arrest crack propagation. Although the inter-layer material has lower wear resistance than the primary layer material, it can also have sufficient wear resistance to allow a steady gradual wear of the inter-layer during drilling and expose the next primary layer. This process has a self-sharpening effect with respect to exposing the next cutting edge.

Some important considerations in designing the tool body and the cutters can include a number of factors such as relative hardness and toughness of materials, dimensions of layers, cutting surface, and overall cutter and interface design among layers. Specifically, the primary layer materials typically can have equal or better wear resistance than that of conventional shear cutters. The inter-layer material can have higher toughness than the primary layer and at the same time higher wear resistance than cemented tungsten carbide materials such as the substrate. The thickness of the primary layer can vary depending on specific applications.

The abrasive composite cutters of the present invention can be useful in a wide variety of tools. One particularly useful application of the present invention can include shear cutters for a PDC bit useful in rock drilling including petroleum exploration and mining. A typical shear cutter consists of the composite cutter and a substrate, e.g. a cemented tungsten carbide. Further, the abrasive composite cutters of the present invention can be useful in producing roller-cone bits for rock drilling or other applications. Such roller-cone bits can include a contoured top surface, e.g. a protruding dome top surface which can typically vary from relatively blunt to more aggressive sharp non-symmetric shapes. As such, the materials of the present invention can also include configurations where the top cutting surface is non-planar, while the conditions regarding alternating layers still apply to each of the flank and top surfaces.

The layer selections and the interface design amongst the layers can also preferably minimize thermal mismatch stress. The interface between layers can be flat or non-planar. An example non-planar interface is a series of repeating steps which interlock. Other non-planar configurations can also be suitable such as, but not limited to, wavy, mounds, triangular grooves, and the like. These features can be formed in a layer as straight lines or as concentric patterns. One method of fabricating a non-planar interface is to form the sheet or the laminate with the aid of the plastic binder under heat. The sheet can be impressed with a form mold or a patterned roller can be passed across the sheet surface. A non-planar interface can reduce thermal mismatch stresses by segregating lateral stresses to smaller areas. Alternatively, or in addition to non-planar interfaces, internal thermal mismatch stresses can be reduced by reducing the difference in composition between adjacent layers. For example, the primary layer can include a small amount of material used in the arresting layers, e.g. 5 to 20 vol %. An optional post-HPHT heat treatment can also serve to reduce thermal mismatch stresses. For example, heating under atmospheric pressure to a temperature below about 1100° C. (e.g. a temperature sufficiently low to avoid back-conversion of diamond to graphite) can be useful in some cases.

In functional gradient materials, materials composition and thus the properties are varied along the axis perpendicular to the surface. Often the functionally gradient materials are designed to have the highest hardness at the surface, and the hardness decreases continuously until it reaches the bulk material composition and property. In most cases, the bulk material (or the internal portions remote from the surface) can be metallic alloys that have high strength and ductility. The surface material is hard and brittle, but offers wear and corrosion resistance, and protection against other harsh service environment. For the shear cutter applications in petroleum drilling, however, the cutter can have high wear resistance, high stiffness, high strength, and high impact resistance. The standard shear cutter design with the polycrystalline diamond overlay on a cemented tungsten carbide substrate offers the combinations of high wear resistance, stiffness, strength, and moderate impact resistance. The shear cutter design using the alternating layers according to this invention improves impact and chipping resistance without compromising other superior properties.

According to the teachings of the present invention, a method of making a polycrystalline abrasive cutter can include forming a cutter precursor having a tool body with a top surface and a flank surface. The cutter precursor can include a plurality of abrasive precursor layers and a plurality of arresting layers such that the layers alternate throughout the tool body in a direction normal to the top cutting surface and in a direction normal to a flank surface. The method can further include treating the cutter precursor under pressure and temperature sufficient to form a polycrystalline abrasive composite cutter of arresting layers and polycrystalline primary layers. The pressure and temperature can be sufficient to sinter the abrasive precursor layers. Additionally, the method can further include the step of heating the cutter precursor sufficient to remove substantially all organic binder prior to the step of treating.

Although a variety of methodologies can be employed to effectively make a polycrystalline abrasive cutter, many of them can include the step or steps of forming a substantially planar laminate assembly of alternating abrasive precursor layers and arresting layers. The abrasive precursor layers can include a first primary particulate abrasive and the arresting layers can include a second particulate material. Such laminate assembly can be created using the technologies of tape casting, coating, spraying, powder packing, three-dimensional printing, or other alternative methods. Currently, tape casting is preferred for a number of reasons including ability to cast thin layers and the relatively high commercial applicability for mass production. Regardless, the ratio of the thickness of abrasive layers to the thickness of the abrasive precursor layers can be the same as those outlined above, but generally can range from about 1:6 to about 1:8.5, or more specifically from about 1:7 to about 1:7.5, although some changes in relative dimensions can occur during dewaxing, consolidation, and/or sintering.

The abrasive precursor layers can be formed, according to one embodiment, by preparing a superabrasive mixture of the first primary particulate abrasive including a particulate superabrasive, a sintering aid, and an organic binder and then roll forming the superabrasive mixture into a sheet. Similarly, the arresting layers can be formed by preparing an abrasive mixture of the second particulate material and an organic binder. Alternatively, the arresting layer can be devoid of abrasive particulate or otherwise abrasive materials, e.g. the arresting layer can be composed primarily of refractory metal carbide or a refractory metal.

These precursor layers or "green bodies" can be formed on a suitable backing such as a paper, film or other material which can optionally be removed prior to sintering. Further, individual single layers of each material can be made separately and then later assembled to form a laminate based on a predetermined design. Alternatively, the laminate can be formed by directly forming each layer on the laminate. The laminate can be optionally pressed to improve consolidation and handling during further processing.

Figure 5:
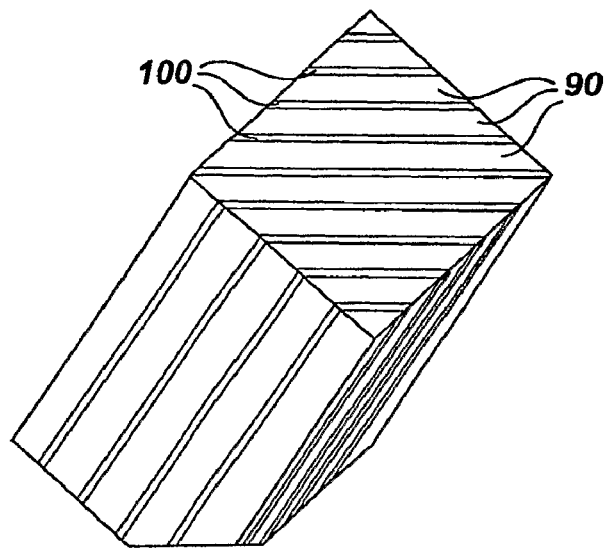
FIG. 5 illustrates a perspective view of a laminate material during processing according to one embodiment of the present invention.
Figure 6:
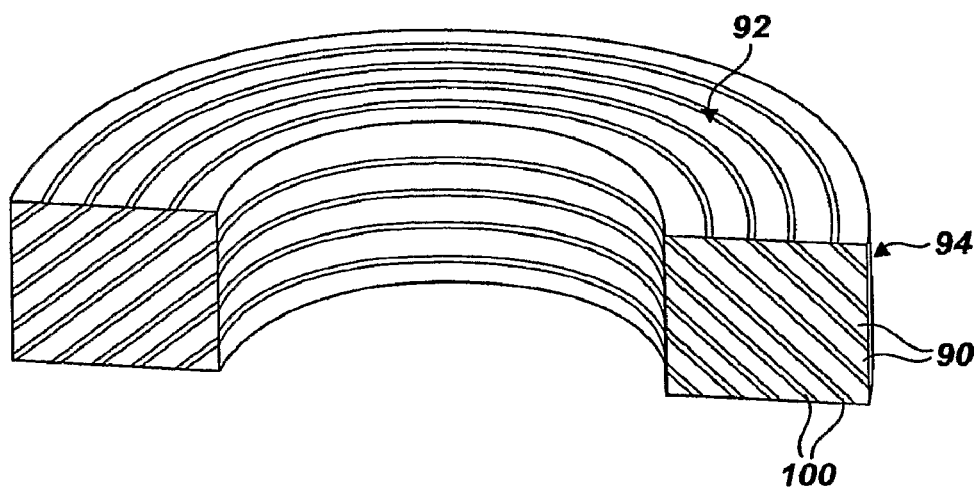
FIG. 6 illustrates a cross-sectional perspective view of a working ring according to one embodiment of the present invention.

Once the laminate assembly is created, further processing can take a variety of forms. One simple approach can be to cut a diagonal section of the laminate assembly. An example of a diagonal section or strip is illustrated in FIG. 5. As shown at the end and throughout, the diagonal strip has abrasive precursor layers 90 and arresting layers 100. The strip can then be shaped into a washer shape as shown in FIG. 6 (in cross-section), wherein abrasive precursor layers 90 and the arresting layers 100 of material terminate on both the top surface and the flank surface, consistent with one embodiment. In this case, the working surface includes top surface 92 and flank surface 94.

Figure 7:
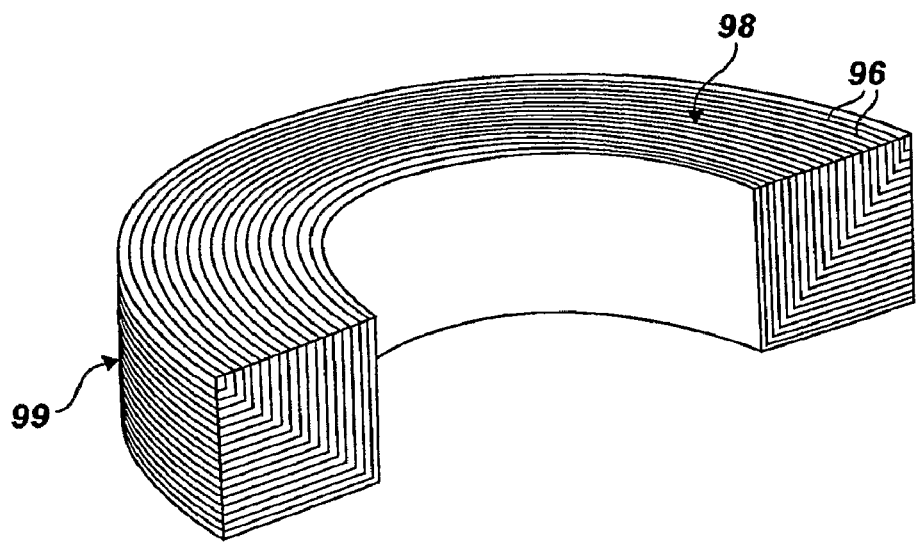
FIG. 7 illustrates a cross-sectional perspective view of a working ring according to one embodiment.

In one aspect, the method can further include the step of shaping the laminate assembly at an angle. In a specific embodiment, the angle can be a right angle. Once the laminate is shaped, in one embodiment it can be trimmed and further shaped to a washer design, thus producing, a shape similar to that shown in FIG. 7. Thus, the arresting layers 96 can be at nearly right angles and are exposed at both the top surface 98 and flank surfaces 99. Further shaping can be done by placing the cutter precursor on a contoured complementary substrate. An example of such a complementary substrate is the shape shown in FIG. 4.

Figure 8:
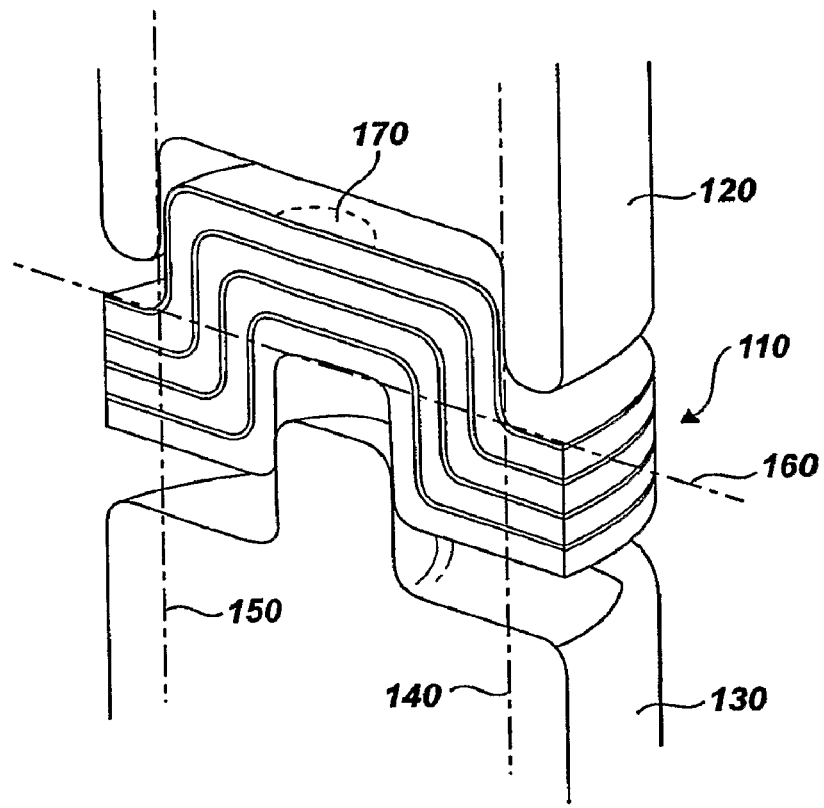
FIG. 8 illustrates a cross-sectional perspective view of a press with laminate material in accordance with one aspect of the present invention.

The shaping to an angle or other contour can be done according to any suitable method such as those described herein or others which would occur to one skilled in the art based on this disclosure. In one embodiment, the shaping to an angle can include use of an extruder or a punch. Such punching mechanisms can take a variety of forms. FIG. 8, for example, shows one embodiment of a punching mechanism in cross-section. The shape of the particular punch creates a folded laminate sheet 110, by pressing of the top punch portion 120 onto the bottom punch portion 130. The resulting folded laminate can be trimmed according to the preferred microstructure design. For example, to obtain a tool body similar to that illustrated in FIG. 1, the folded laminate can be trimmed along the axes 140, 150 and 160, where 140 and 150 define an annular cut while 150 is a planar cut substantially parallel to the arresting layers. To produce a tool body similar to that illustrated in FIG. 3, the folded laminate can be trimmed along the axes 140 and 150 and further punched through the center in an area noted by 170. The center removal can occur pre- or post-punch. Alternatively, the center portion can be left in place and the trimmed laminate can be mounted on a complementary substrate as is.

Alternatively, an extrusion die can be formed wherein an intake portion of the die receives a laminate (usually planar, although contoured laminates can also be extruded) along a side edge of the laminate and the interior dimensions of the die are such that the laminate is compressed and angled to a desired angle, e.g. about 90° in some embodiments. The extruded laminate can then be shaped into an annular ring or other shape suitable for treatment to form a final tool. Further, the die can include additional contouring features which allow not only for shaping of the overall laminate, but impressing features and other contours onto the final laminate as discussed previously.

Another manufacturing method can include three-dimensional printing where powder materials are printed down in a desired three-dimensional pattern or as sheets. Such printing can be determined by the available technology and can be performed in a piece-wise assembly. After a top and a side are formed, the pieces can be assembled and sintered. Alternatively, at least two printing mechanisms (i.e. each containing a different powder composition) can be used to build a desired laminate, including variations in the arresting layer shapes, in order to expedite formation of the shaped laminate in a single step, i.e. formation and shaping.

Manufacturing of the shear cutters according to the present invention can be achieved using polymer assisted shaping techniques. By one method, the powder mixtures with the primary PCD composition and the powders of the inter-layer composition can be mixed with thermal plastics separately. As discussed, each composition mixture can then be formed into thin sheets using conventional roll forming, other tape casting methods, or the like. The sheets of the two (or more) materials with different compositions can then be stacked together alternately according to a pre-designed alternating sequence to form laminate. The laminate can also be obtained by co-extrusion of the powder/polymer mixtures with different compositions.

The flat laminate with the thermal plastic binders can be shaped according to the functionally designed meso- or micro-structure. The shaped laminate can then be placed on the substrates. Non-limiting examples of suitable substrates include WC—Co and refractory metal carbides. The assembly can then be subjected to debinding and sintering and/or consolidation processes according to industry standard practices.

The following examples illustrate various methods of making composite cutters in accordance with the present invention. However, it is to be understood that the following are only exemplary or illustrative of the application of the principles of the present invention. Numerous modifications and alternative compositions, methods, and systems can be devised by those skilled in the art without departing from the spirit and scope of the present invention. The appended claims are intended to cover such modifications and arrangements. Thus, while the present invention has been described above with particularity, the following Example provides further detail in connection with one specific embodiment of the invention.

EXAMPLE 1

Shear Cutter with Laminated Microstructure Toughened Cutting Edge

A laminate is designed as follows: The primary PCD layer; the inter-(primary) PCD layer, the entire cutting edge, and the substrate.

An example of compositions and thicknesses of these layers are as follows.

Primary PCD layers: Cd (diamond)+12% wt Co
  Cd grain size: 10-30 microns
  Thickness: 100 microns
Inter-(primary) PCD layers: Cd (diamond)+60 vol % WC—Co
  Cd grain size: 1-5 microns
  Thickness: 10 microns
Overall laminate thickness: 3 mm.
Substrate: WC-14 wt % Co A superabrasive mixture of the diamond and Co with 30-60 vol % of polymer binder is formed into a paste. Similarly, an abrasive inter-layer mixture of diamond and WC—Co with 30-60 vol % of polymer binder is also formed into a paste. These mixtures are tape cast into alternating sheets of sixteen superabrasive mixture sheets and fifteen inter-layer mixture sheets to form a laminate assembly. The laminate is formed into an "L" shaped circular part by thermal molding methods and then trimmed to form a disc that will become the cutting layer. The disc is then placed on the substrate, de-binded (e.g. dewaxed), and consolidated via standard high temperature high pressure (HTHP) process which is common in the synthetic diamond industry to form a composite polycrystalline cutter.

EXAMPLE 2

Three-Dimensional Printing

Equipment and Procedure:

In order to manufacture this type of shear cutter, two parts need to be made separately. The first part is the cemented tungsten carbide substrate. The second is the polycrystalline diamond part. After these two parts are ready, they are assembled together and then go through the HTHP process. With some machining work on the sintered part, the final product of a shear cutter is obtained. The final product according the method described is similar to FIG. 2.

Fabrication of Part 1:

Part 1 is broken down into two subparts known as the insert and the shell where the insert includes the layers of FIG. 2 which are oriented in a vertical direction, and the shell includes the layers oriented in a horizontal direction. An "L" shape is sought after for this polycrystalline shape as explained above and having two components, a primary layer and an interlayer. For the shell part, a technique of 3-D printing is used to deposit powders layer by layer with the appropriate composition. After depositing, it is left to dry in preparation for the next step. For the insert part, a 3-D printing technique is used again, but is modified to deposit the powder on a rotating axis to fabricate the part in the shape of a circle. The insert is then mated with the shell to form part 1.

Fabrication of Cemented Tungsten Carbide Part:

Starting with the powder, the WC is milled along with Co according to the designed composition. The milled product is cold pressed into the desired shape similar to FIG. 4, and a vacuum sintering process finishes the part.

Assembly and HTHP Process:

The polycrystalline diamond (part 1) and cemented tungsten carbide are assembled together and go through the high temperature high pressure process. This produces the sintered parts. After some machining, the final parts are made.

EXAMPLE 3

Preparation of Laminate Assembly

Combine a desired powder with a binder to produce a moldable pattern which deforms at elevated temperatures. This binder/powder system typically consists of 50/50 by volume percent ratio though this ratio is highly dependent on desired outcome. The $T_g$ (glass transition temperature) of the binder system should be higher than room temperature but not too high where the material cannot be touched with a protected human hand.

There are at least two starter sheet compositions: primary layer and interlayer and each will have powder and binder compositions dependent on its purpose and chosen based on the guidelines provided above. Both the primary layers and the interlayers preferably have similar elevated temperature mechanical properties to avoid stress induced cracks. Each phase binder/powder system can be placed under platen pressure and pressed to desired thickness. For example, the primary layer can be designed with a thickness of 220 microns and the interlayer can be designed with a thickness of 30 microns. Alternatively, the binder/powder system can be fed into roll mill until desired thickness is acquired. This step will not immediately create the final thicknesses mentioned above of 220 microns and 30 microns but rather a proportional thickness which, upon further processing, will reach the final thickness.

Individual and pressed starter sheets of differing compositions can be stacked one on top of the other to form a "sandwich" of alternating layers. The proposed pattern is primary, interlayer, primary layer, interlayer, etc. Repeat the pressing and/or rolling step with layered sandwich so that the final primary and interlayer thicknesses are achieved.

Of course, it is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been described above with particularity and detail in connection with what is presently deemed to be the most practical and preferred embodiments of the invention, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A polycrystalline abrasive composite cutter, comprising a tool body having a top cutting surface and a flank surface, said tool body including a plurality of polycrystalline abrasive layers and a plurality of arresting layers so that the layers alternate throughout the tool body in a direction normal to the top cutting surface and in a direction normal to the flank surface, wherein the arresting layers and the polycrystalline abrasive layers are distributed within the tool body such that a plurality of arresting layers terminate on the top cutting surface and the flank surface.

2. The polycrystalline abrasive composite cutter of claim 1, wherein the arresting layers have a higher toughness and a lower hardness than contacting polycrystalline abrasive layers.

3. The polycrystalline abrasive composite cutter of claim 2, wherein each of the plurality of arresting layers have a toughness about 10% to about 400% higher and a hardness about 5% to about 50% lower than respective contacting polycrystalline abrasive layers.

4. The polycrystalline abrasive composite cutter of claim 1, further comprising a tool substrate attached opposite the top cutting surface.

5. The polycrystalline abrasive composite cutter of claim 1, comprising about 4 to about 100 arresting layers and about 5 to about 100 polycrystalline abrasive layers.

6. The polycrystalline abrasive composite cutter of claim 1, wherein the polycrystalline abrasive layers comprise a polycrystalline superabrasive.

7. The polycrystalline abrasive composite cutter of claim 1, wherein the polycrystalline abrasive layers comprise a refractory metal carbide in an amount greater than 50%.

8. The polycrystalline abrasive composite cutter of claim 1, wherein the arresting layers comprise a refractory metal carbide and a polycrystalline superabrasive.

9. The polycrystalline abrasive composite cutter of claim 1, wherein the arresting layers consist essentially of a polycrystalline superabrasive, a refractory metal carbide, or a refractory metal carbide and a metal.

10. The polycrystalline abrasive composite cutter of claim 1, wherein the arresting layers have a thickness from about 1 μm to about 100 μm and the polycrystalline abrasive layers have a thickness from about 1 μto about 1000 μm.

11. The polycrystalline abrasive composite cutter of claim 1, wherein the ratio of a thickness of the arresting layers to a thickness of the polycrystalline abrasive layers is about 1:4 to about 1:75.

12. The polycrystalline abrasive composite cutter of claim 1, wherein the plurality of arresting layers are continuous layers which each individually extend to contact both the top cutting surface and the flank surface.

13. A method of making a polycrystalline abrasive composite cutter, comprising:
   a) forming a cutter precursor having tool body including a top surface and a flank surface, said cutter precursor including a plurality of abrasive precursor layers and a plurality of arresting layers such that the layers alternate throughout the tool body in a direction normal to the top cutting surface and in a direction normal to the flank surface wherein the forming further comprises orienting the abrasive precursor layers and the arresting layers such that the ends of the layers are exposed on at least two different surfaces of the cutter precursor; and
   b) treating the cutter precursor under pressure and temperature sufficient to form a polycrystalline abrasive composite cutter of arresting layers and polycrystalline primary layers.

14. The method of claim 13, wherein the polycrystalline abrasive material is a polycrystalline superabrasive or a refractory metal carbide.

15. The method of claim 13, wherein the step of forming the cutter precursor includes forming a substantially planar laminate assembly of alternating abrasive precursor layers and arresting layers, said abrasive precursor layers including a first primary particulate abrasive and said arresting layers including a second particulate material.

16. The method of claim 15, wherein the step of forming the laminate assembly includes tape casting the abrasive precursor layers and arresting layers.

17. The method of claim 15, wherein the abrasive precursor layers are formed by preparing a superabrasive mixture of the first primary particulate abrasive including a particulate superabrasive, a sintering aid, and an organic binder and then roll forming the superabrasive mixture into a sheet.

18. The method of claim 15, wherein the step of forming said cutter precursor includes shaping said laminate assembly at an angle.

19. The method of claim 18, wherein the shaping is done by using an extruder or a punch.

20. The method of claim 19, further comprising placing the cutter precursor on a contoured complementary substrate.

21. The method of claim 13, wherein the ratio of the thickness of the arresting layers to the thickness of the abrasive precursor layers is about 1:4 to about 1:75.

22. The method of claim 13, wherein the step of forming includes three-dimensional printing.

23. The method of claim 22, wherein the three-dimensional printing is done piece-wise and the pieces are assembled and sintered.

* * * * *